United States Patent
Sullivan et al.

(10) Patent No.: US 6,591,224 B1
(45) Date of Patent: Jul. 8, 2003

(54) BIOMETRIC SCORE NORMALIZER

(75) Inventors: Brian M. Sullivan, Hermosa Beach, CA (US); Shi-Ping Hsu, Pasadena, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 129 days.

(21) Appl. No.: 09/585,211

(22) Filed: Jun. 1, 2000

(51) Int. Cl.$^7$ .................................. G06K 9/80
(52) U.S. Cl. .................. 702/179; 702/32; 702/108; 702/181; 702/183; 702/189
(58) Field of Search ................ 702/179–181, 702/19, 321, 1.08, 124, 183, 188, 189; 382/115–127; 356/71; 340/5.53, 5.83, 5.52, 5.58; 707/6; 713/186, 200; 902/3, 6; 703/2

(56) References Cited

U.S. PATENT DOCUMENTS

| | | | | |
|---|---|---|---|---|
| 5,559,895 A | * | 9/1996 | Lee et al. ................ | 382/119 |
| 5,761,330 A | * | 6/1998 | Stoianov et al. ......... | 382/127 |
| 5,790,668 A | * | 8/1998 | Tomko .................... | 235/380 |
| 5,991,408 A | * | 11/1999 | Pearson et al. .......... | 380/44 |
| 6,317,834 B1 | * | 11/2001 | Gennaro et al. ......... | 380/286 |
| 6,434,259 B1 | * | 8/2002 | Hamid et al. ........... | 382/115 |
| 2001/0048025 A1 | * | 12/2001 | Shinn .................... | 235/382 |
| 2001/0049785 A1 | * | 12/2001 | Kawan et al. .......... | 713/156 |
| 2002/0009213 A1 | * | 1/2002 | Rowe et al. ............ | 382/115 |

FOREIGN PATENT DOCUMENTS

| | | | | |
|---|---|---|---|---|
| GB | 2229305 | * | 9/1990 | ........ A61B/5/117 |
| WO | WO 200124103 A1 | * | 4/2001 | ........ G06K/9/00 |

* cited by examiner

*Primary Examiner*—Marc S. Hoff
*Assistant Examiner*—Carol S Tsai
(74) *Attorney, Agent, or Firm*—Noel F. Heal

(57) ABSTRACT

Method and apparatus for providing a standardized measure of accuracy of each biometric device in a biometric identity authentication system having multiple users. A statistical database includes continually updated values of false acceptance rate and false rejection rate for each combination of user, biometric device and biometric device comparison score. False acceptance rate data are accumulated each time a user successfully accesses the system, by comparing the user's currently obtained biometric data with stored templates of all other users of the same device. Each user is treated as an "impostor" with respect to the other users, and the probability of an impostor's obtaining each possible comparison score is computed with accumulated data each time a successful access is made to the system. The statistical database also contains a false rejection rate, accumulated during a test phase, for each combination of user, biometric device and biometric device comparison score.

10 Claims, 4 Drawing Sheets

BIOMETRIC SCORE NORMALIZER

BACKGROUND OF THE INVENTION

The present invention relates generally to authentication and identification mechanisms that compare a measured physical trait or characteristic behavior of a person with a previously stored representation of the same trait or characteristic, to determine if the person is who he or she claims to be. This process is termed biometric authentication. More specifically, the invention pertains to techniques for determining individual device operating characteristics for users of a system that employs biometric identification and authentication.

Biometric methods of identification and authentication, whether using fingerprints, speech analysis, or other characteristics, have only limited reliability. Each different biometric device in general will have different levels of accuracy and reliability. A related issue is that a single biometric device will, in general, exhibit an accuracy that varies from one user to another. One measure of the accuracy of a biometric device is the false acceptance rate (FAR), indicating the frequency (usually expressed as a percentage) that the device provides positive identification for someone who seeks authentication but is not the enrolled user of the device. Higher values of FAR are indicative of a higher security risk posed by use of the biometric device. Another measure of accuracy is the false rejection rate (FRR), which indicates the frequency (usually expressed as a percentage) that the biometric device rejects properly enrolled users. Designing or adjusting a device to provide a low FAR, and hence a low security risk, will usually result in a high FRR. The FRR may be viewed as a measure of inconvenience of using the device. It will be appreciated, therefore, that there is a statistical tradeoff between security risk, as measured by FAR, and inconvenience, as measured by FRR.

Biometric device vendors typically provide a claimed authentication accuracy for each attempted access or other use of the device. Some provide a simple yes/no result and others provide an authentication score, but each vendor's measure of the results of a biometric comparison is likely to be different from the others. Because no single biometric authentication technique has been able to provide an acceptable compromise between security and convenience, systems are often designed to employ multiple biometric devices for each attempted access; for example, fingerprint and voice identification. When multiple biometrics are used in a single system, the system designer faces a significant challenge in deciding how to combine the results of each biometric device. One possibility is simply to grant access if both devices supply a "yes" result and to deny access otherwise, but without regard to any quantitative interpretation of each "yes" result. While the simplicity of this approach is appealing, it usually leads to an unnecessarily high false rejection rate (FRR).

It will be appreciated from the foregoing discussion that there is a need for a technique for quantifying the authentication accuracy of biometric devices, to facilitate analysis, comparison and combination of the results of different biometric devices. The present invention addresses this need.

SUMMARY OF THE INVENTION

The present invention resides in a method and apparatus for normalizing biometric test scores generated by multiple biometric devices for multiple users. Briefly, and in general terms, the method of the invention comprises the steps of, for each user enrolled to use each biometric device, maintaining a statistical database containing a standardized measure of accuracy for each possible score of the biometric device for this particular user; obtaining a current score from a biometric device for this particular user; and converting the current score to a standardized measure of accuracy obtained from the statistical database.

More specifically, the step of maintaining a statistical database includes the following steps performed each time a user successfully accesses a protected system using a biometric device: obtaining current biometric data from this user; comparing the current biometric data of this user with stored biometric templates of other users enrolled to use the same biometric device, wherein the biometric data of this user are compared as "impostor data" with the other user templates, and a comparison score is obtained from the biometric device; after each comparing step, updating a count of impostor comparisons performed for each of the other users, and updating a count of the number of times the resulting comparison score is obtained for impostor comparisons relative to each other user; updating the probability of occurrence of each comparison score; and computing an equivalent false acceptance rate from the probabilities of occurrence of the comparison scores, wherein the false acceptance rate provides an objective measure of security risk for this particular user and biometric device. With the statistical database maintained in this matter, the step of converting the current biometric score to a standardized measure of accuracy simply includes retrieving from the statistical database a false acceptance rate corresponding to this user, the current biometric device and the current biometric score.

Alternatively, or in addition, the method also includes generation of false rejection rate data. Thus the step of maintaining a statistical database may include the following steps performed each time a user successfully accesses a protected system during a data gathering phase of operation and provides data to a biometric device: obtaining current biometric data from this user; comparing the current biometric data of this user with a stored biometric template of this user obtained during enrollment to use the same biometric device, and obtaining a comparison score from the biometric device; after each comparing step, updating a count of test comparisons performed for this user, and updating a count of the number of times the comparison score is obtained for this user; updating the probability of occurrence of each comparison score; and computing an equivalent false rejection rate from the probabilities of occurrence of the comparison scores, wherein the false rejection rate provides an objective measure of convenience of use for this particular user and biometric device. If the statistical database includes false rejection rate data, the step of converting the current biometric score to a standardized measure of accuracy includes retrieving from the statistical database a false rejection rate corresponding to this user, the current biometric device and the current biometric score.

In terms of novel apparatus, the invention may be defined as a biometric score normalizer for use in an authentication system having multiple biometric devices and multiple users. Briefly, and in general terms, the biometric score normalizer of the present invention comprises: a statistical database containing, for each user enrolled to use each biometric device, at least one standardized measure of accuracy for each possible score of the biometric device; means for accumulating data in the statistical database, wherein at least one standardized measure of accuracy is updated as users attempt access to the authentication system; and means for converting a raw biometric device score into at least one standardized measure of accuracy by accessing the statistical database.

In the biometric score normalizer as defined above, the statistical database preferably contains an equivalent value of false acceptance rate for each combination of user, biometric device and biometric device score. Thus the means for accumulating data in the statistical database includes: means for obtaining current biometric data from this user; means for comparing the current biometric data of this user with stored biometric templates of other users enrolled to use the same biometric device, wherein the biometric data of this user are compared as "impostor data" with the other user templates, and a comparison score is obtained from the biometric device; means operative after the means for comparing, for updating a count of impostor comparisons performed for each of the other users, and updating a count of the number of times the comparison score is obtained for impostor comparisons relative to each other user; means for updating the probability of occurrence of each comparison score; and means for computing an equivalent false acceptance rate from the probabilities of occurrence of the comparison scores, wherein the false acceptance rate provides an objective measure of security risk for this particular user and biometric device.

Alternatively, or additionally, the statistical database contains an equivalent value of a false rejection rate for each combination of user, biometric device and biometric device's score. The means for accumulating data in the statistical database further includes: means for obtaining current biometric data from a user during a test phase of operation; means for comparing the current biometric data of this user with a stored biometric templates of this user obtained during enrollment to use the same biometric device, and obtaining a comparison score from the biometric device; means for updating a count of test comparisons performed for this user, and updating a count of the number of times the comparison score is obtained for this user; means for updating the probability of occurrence of each comparison score; and means for computing an equivalent false rejection rate from the probabilities of occurrence of the comparison scores, wherein the false rejection rate provides an objective measure of convenience of use for this particular user and biometric device.

It will be appreciated from the foregoing summary that the present invention represents a significant advance in the use of biometric devices for identification and authentication. In particular, the invention provides for the ongoing accumulation of false acceptance rate and false rejection rate data for each combination of user, biometric device and biometric device score. Thus the invention also provides data that permits more objective assessment of biometric device scores, particularly in cases where multiple biometrics are used to authenticate each prospective user. Other aspects and advantages of the invention will become apparent from the following more detailed description, taken in conjunction with the accompanying drawings.

DESCRIPTION OF THE PREFERRED EMBODIMENTS

Figure 1:
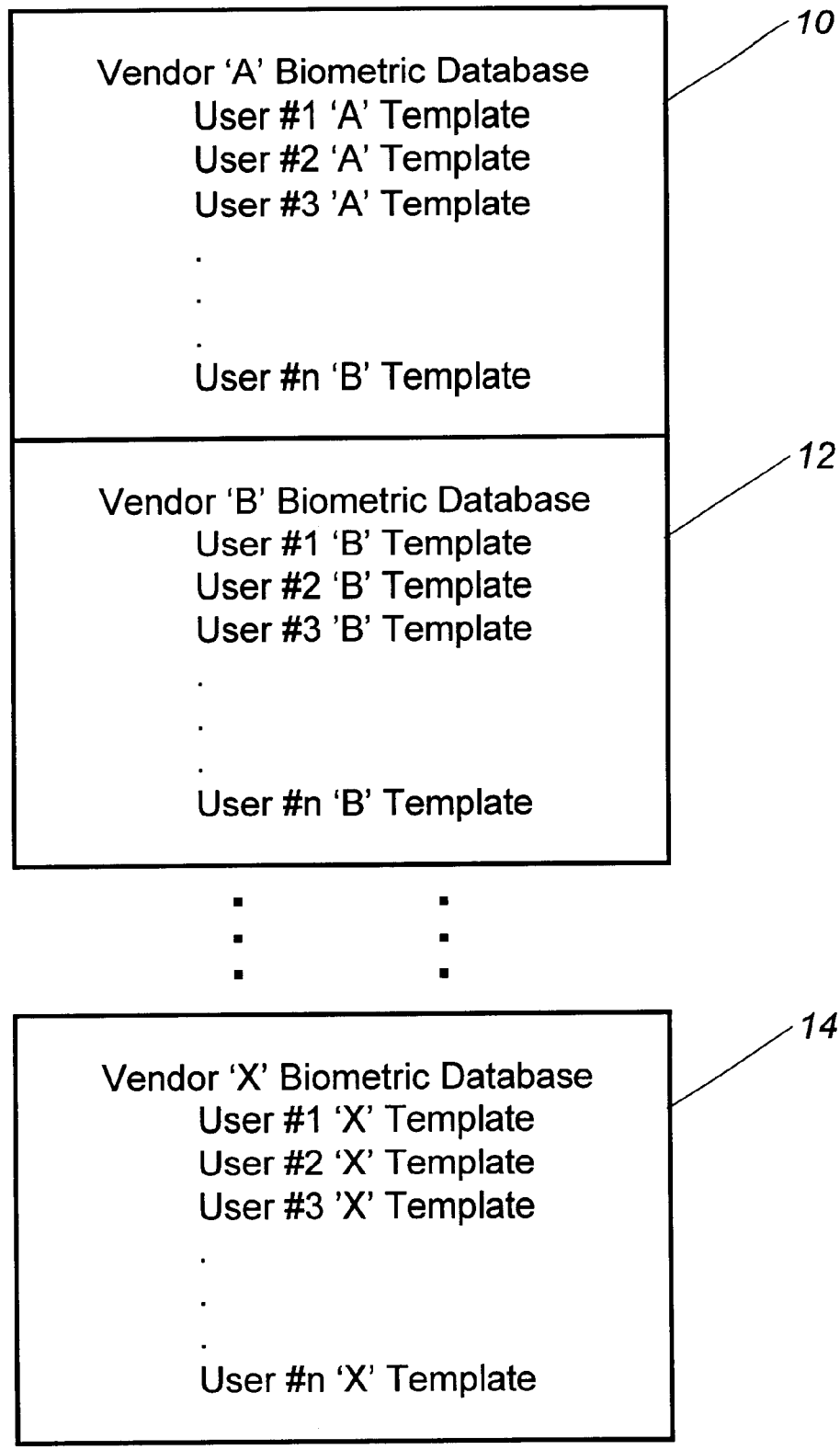
FIG. 1 is a block diagram of a database of enrolled users' biometric templates.

As shown in the drawings for purposes of illustration, the present invention pertains to a technique for quantifying biometric device authentication accuracy characteristics for multiple biometric devices. More specifically, the invention is embodied in a method and apparatus for generating and using individual device or receiver operating characteristic (ROC) curves, and their underlying data, for users of a system that employs one or more biometric devices for user identification and authentication. As will become clear, these curves or their underlying data allow quantification of the statistical tradeoff between false acceptance rate (FAR), which is a measure of security risk, and false rejection rate (FRR), which is a measure of inconvenience of use. If statistics are maintained for all of the biometric devices that a user is enrolled for, the measurements facilitate comparison of the biometric devices. For example, it can readily be determined whether a user is a "better" candidate for voice identification versus fingerprint identification, whether in terms of security, convenience or both.

For purposes of illustration, it is assumed that a biometric "system" has n users and that each user has enrolled to use some or all of a number of different biometric devices. These are illustrated in FIG. 1 as being supplied by different "vendors," including vendor A, vendor B, and so on through vendor X. (The use of the letters A through X is not meant to imply, however, that there are twenty-four vendors.) One "biometric device" may be distinct from another in its use of hardware components, such as fingerprint cameras, or in its use of software components, such as feature extraction and matching algorithms. Alternatively, the biometric devices may be different in type, such as fingerprint devices and voice analyzers. Each user who has enrolled for a biometric device will have a "template" included in the database for that device. The term "template" is used to include any data record that uniquely identifies the user. For a fingerprint device, the template may be an entire fingerprint image, but more likely includes only identifying portions of the fingerprint image. Similarly, a "voiceprint" template of a user may be a spectral analysis or significant portions of a spectral analysis of a speech sample of the user.

FIG. 1 shows, again for purposes of illustration, a database of enrollment templates in which each biometric device in the database includes a template for each of the n users. As noted earlier, however, each user may be enrolled to use only some of the biometric devices. The database includes user templates for the vendor A biometric device, as indicated in block 10, user templates for the vendor B biometric device, as indicated in block 12, and user templates for additional vendors' biometric devices, only one of which is shown, the vendor X biometric device, as indicated in block 14.

An important concept underlying the invention is termed "impostor testing," wherein each attempted access to the system by one user results in a comparison not only with the purported user's template for a particular biometric device, but also with the other users' templates for the same biometric device. Thus, over a period of time, each user's templates in the database of FIG. 1 are tested for use by potential "impostors," i.e., other users. In this regard, users #2 through #n are treated as impostors with respect to user

1. Further, with regard to user #1, for example, the system keeps track of the total number of impostors who have been tested against the user #1 template and also tabulates how many times each possible biometric score is obtained. This process is performed not only for each user but also each biometric device, and is performed regardless of the type of "score" produced by the device. As mentioned above, some devices produce simple yes/no results and others may generate a numerical score. In the process of impostor testing, for impostors of user #1 the average probability of obtaining each score is computed from the number of times that the score was obtained divided by the number of access attempts using the user #1 template. The false acceptance rate (FAR) pertaining to any given score will be the sum of the probability of obtaining that score plus the probabilities of obtaining "greater" scores.

Impostor testing proceeds automatically whenever a user attempts to access the system. If, for example, someone purporting to be user #1 attempts to log in to the system using biometric devices A and B, the A and B templates of user #1 are employed for authentication. If the log-in attempt succeeds, the biometric data obtained from the user during log-in are also compared with the corresponding biometric templates of each of the other users, for both the A and B databases. For each of the other users, counts are maintained for each comparison score generated for each of the A and B biometric devices. From these counts, accumulated over a period of time, the false acceptance rate (FAR) can be generated for any combination of user, biometric device and score. The FAR for a particular score is computed as the sum of the probability of obtaining that score (the number of times the score was obtained divided by the total number of attempts to log in using the particular biometric device), plus the probabilities of obtaining greater scores, if any. (Obviously, in the case of yes/no scoring there is no "greater" score than "yes.")

Whenever a user logs in or attempts access to the system, the score provided by each biometric device can be immediately converted to a more useful and standardized measure, the false acceptance rate (FAR), based on the accumulated impostor testing statistics. The FAR reflects the probability of obtaining the biometric score if the purported user were an impostor; and quantifies the security risk for the particular attempted access.

The other standardized measure that can be derived from similarly accumulated data is the false rejection rate (FRR). There is, of course, an additional difficulty that arises in determining any instance of false rejection. Specifically, false rejection has to be confirmed by independent verification of the purported user's identity. When a user is denied access, this can be recorded as a false rejection only if the user is given the opportunity to prove his or her identity by some other means. Therefore, the accumulation of FRR data must be performed during a controlled "set-up" phase prior to regular operation of the system, or during a periodic testing phase to update accumulated FRR data. During the set-up phase or periodic testing phase, each user's identity is independently verified by some non-biometric means, such as a key, token or password. When, for example, user #1 attempts to log in, the input biometric data are compared against the biometric database templates for user #1, such as the user #1 templates for biometric devices A and B. As with the FAR processing, the probability of obtaining every given score is computed from the ratio of the number of times that the score is obtained divided by the total number of attempts. The false rejection rate (FRR) for any given score is the sum of the probabilities of obtaining each score lower than the given score.

Figure 2:
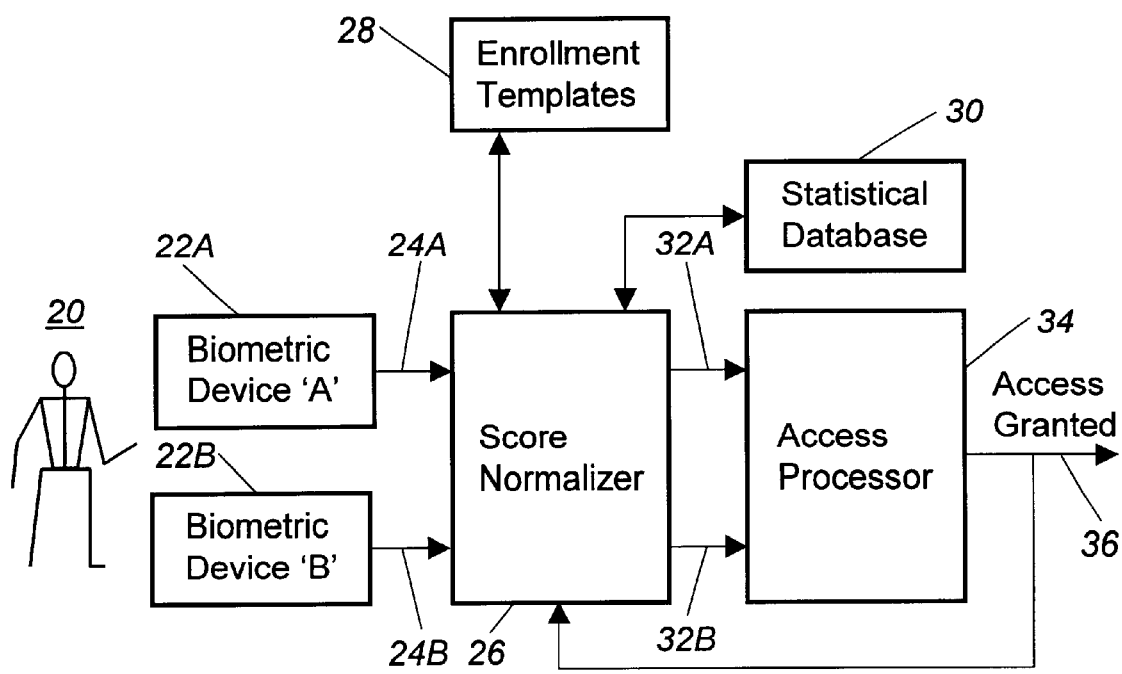
FIG. 2 is a block diagram of a system using a biometric score normalizer in accordance with the present invention.

FIG. 2 depicts a generalized system embodying the present invention. A user, indicated at 20, approaches one or more biometric devices, two of which are shown at 22A and 22B. Each device generates a "raw" score, as indicated on output lines 24A and 24B, and these scores are processed by a score normalizer 26 in accordance with the invention. The score normalizer 26 has access to the enrollment templates of FIG. 1, indicated by block 28, and generates a statistical database 30 in accordance with the processing techniques discussed above. Using the contents of the statistical database 30, the score normalizer converts "raw" scores on lines 24A and 24B to normalized or standardized scores based on the false acceptance rate (FAR) and false rejection rate (FRR), on lines 32A and 328. An access processor 34 uses the normalized scores to make an access decision, i.e., whether to grant or deny the user access. An access-granted signal is transmitted to a door, computer file, or other structure to which access is controlled, and is also fed back to the score normalizer 26, which performs certain operations only if a request for access is successful.

Figure 3:
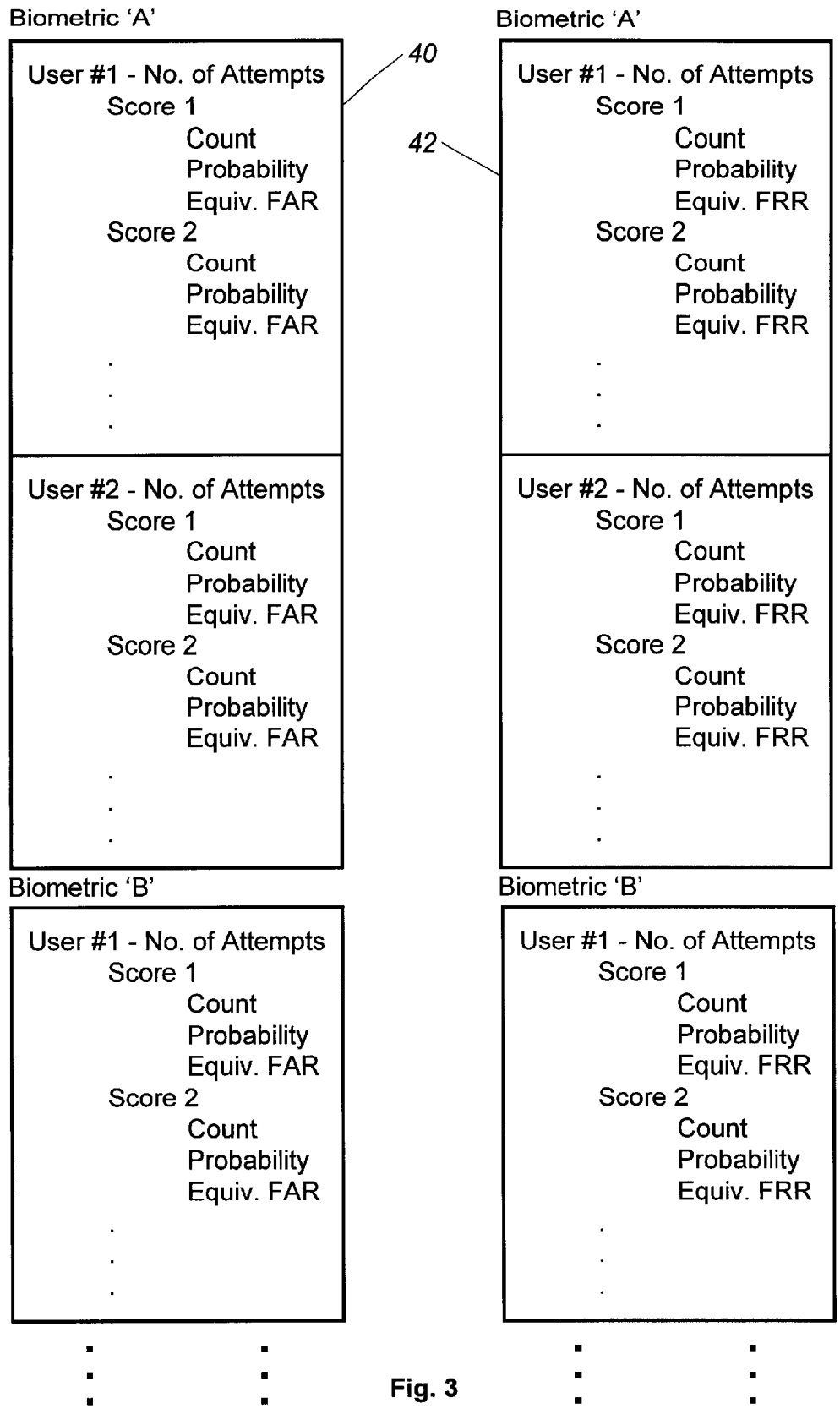
FIG. 3 is a block diagram representation of a statistical database used by the biometric score normalizer of the present invention.

The statistical database 30 is shown diagrammatically in FIG. 3. It consists of an FAR portion 40 and an FRR portion 42. Both portions 40 and 42 have a separate segment for each biometric device that may be used with the system, and each device segment of the database has a sub-segment for each user enrolled for that particular biometric device. For each user, there is a field in the database to record and maintains a number of access attempts pertaining to that user. For the FAR portion of the database, the number of attempts is updated (incremented by one count) every time some "impostor" biometric data is compared with this user's template. It will be recalled that every authenticated user seeking access will have his or her data automatically compared with the templates of the other users, to determine the false acceptance rate for each score. Also recorded in the FAR portion 40 of the database is a count of the number of times each biometric score has been obtained by this user and the probability of obtaining the score. The probability is computed from the score count and the total number accesses for the user. The probabilities for all of the scores will, of course, sum to unity. Finally, the FAR database portion 40 also contains for each score (for each user) an FAR value. Each FAR value, for a given score, is computed from the sum of the probability of obtaining the score, plus the probabilities of obtaining greater scores. The score normalizer 26 selects the appropriate FAR value for the user and biometric device under consideration. This is the FAR corresponding to the raw biometric score.

The FRR portion 42 of the statistical database 30 is similarly structured except that the number of attempted accesses for each user pertains to attempts by the user himself or herself, and not to attempts by impostors. Each score has an associated probability, computed from the ratio of the number of times that the score is achieved divided by the total number of attempts at access for each user using that biometric device. The corresponding false rejection ratio (FRR) is computed from the sum of the probabilities corresponding to scores less than the score under consideration. Another distinction from the FAR portion 40 of the statistical database is that the FRR statistics are accumulated only during test periods during which the users' identities can be authenticated independently of biometric devices.

The score normalizer 26 of the present invention provides the access processor 34 (FIG. 2) in a particular authentication application with FAR and FRR values for each biometric device employed by the user. Moreover, the FAR and FRR values are specific to each user. These normalized values may be used in a variety of ways by the access processor 34, depending on application requirements. The FAR data quantify the security risk, user-by-user and biometric device-by-device. An overall FAR value can be computed by multiplying two or more FAR values for the same user and different biometric devices. The relative reliability of different biometric devices can be easily compared and their results appropriately weighted in determining whether to grant access. For example, a user's fingerprint data may be relatively unreliable (subject to a high FAR), but voice data for the same user may be relatively reliable (subject to a low FAR). Thus it would be inappropriate to reject the user based on his fingerprint data. In other words, granting access based on passing one of two biometric tests may be appropriate and justified by the statistical FAR data. Similarly, when convenience of access is important, it may be appropriate to ignore results of one biometric device when its FRR value is too high for a particular user, so long as other biometric devices provide an acceptably low FRR.

More generally, given the availability of a standardized or normalized measure of results from a variety of biometric devices, algorithms may be developed to weight the multiple biometric results appropriately on a user-by-user basis, to achieve the goals of a particular application.

Figure 4:
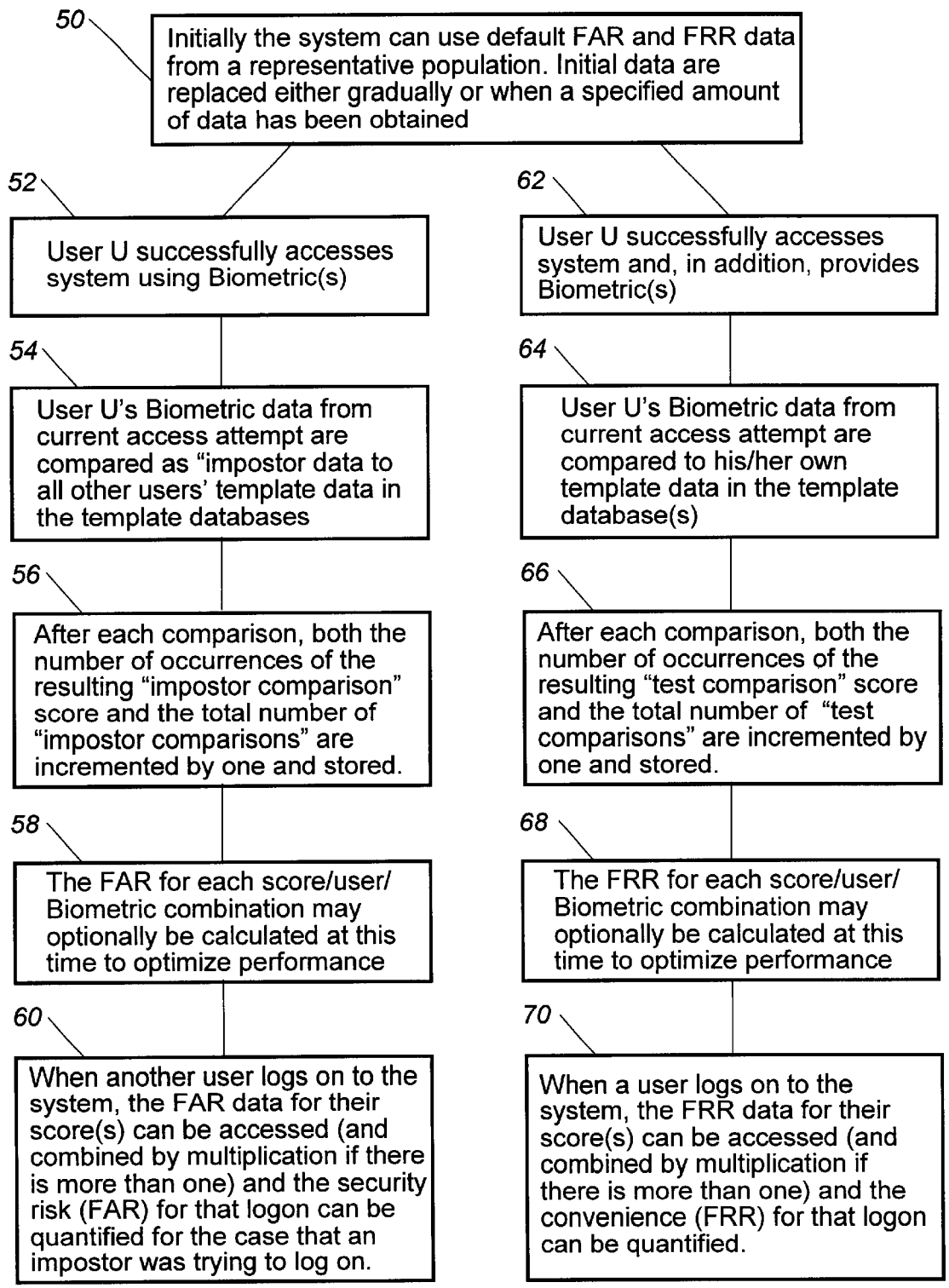
FIG. 4 is a flowchart showing the principal functions performed in using the biometric score normalizer of the present invention.

FIG. 4 shows in flowchart form the functions performed by a system employing the biometric normalizer of the present invention. As indicated in block 50, initially the statistical database may be populated with data from a representative population, collected in other systems of a similar type. These data entries may be replaced gradually as a particular system is operated, or after a specified amount of data is obtained. If circumstances permit, the system can be operated for a short time on a trial basis, while data are accumulated both for the FAR and the FRR portions of the statistical database. Following the establishment of an initial database by one of these techniques, operation of the system proceeds along parallel paths, indicated by the left-hand column of blocks for FAR data accumulation, and the right-hand column of blocks for FRR data accumulation. These are hot alternate paths but should be considered as being followed simultaneously.

When a user successfully accesses the system by providing biometric data for one or more biometric devices, as indicated in block 52, the user's biometric data provided for the current access are compared as "impostor data" to all other users' template data in the enrollment template database, as indicated in block 54. After each comparison with another user's template, as indicated in block 56, the resulting biometric score is recorded by incrementing a count associated with the particular score, and incrementing a count of the total number of "impostor" comparisons for the particular user whose template was used in the comparison.

At this point, as indicated in block 58, the false acceptance rate (FAR) may be recalculated, for optimum performance; for each score/user/biometric device combination. As described above, an intermediate step is the computation of the probability of obtaining each score in the impostor comparison. Then the FAR is computed from these probabilities. As an alternative to updating the FAR values after every successful access, they may be calculated and updated periodically.

As indicated in block 60, the accumulated FAR data are used whenever a user logs on the system. Each biometric score obtained during log-on is used to retrieve the corresponding FAR value, which quantifies the security risk that an impostor would be incorrectly identified as the user.

As indicated in the right-hand column of blocks in FIG. 4, a slightly different approach is needed for the accumulation of false rejection rate (FRR) data. To accumulate FRR data, users must provide independent, non-biometric identification during a test phase of operation of the system. During the test phase, as indicated in block 62, a user may successfully access the system and additionally supplies biometric data. Then, as indicated in block 64, the user's biometric data obtained in the current access are compared to the user's own template data in the enrollment database. As indicated in block 66, after each such comparison the score obtained is recorded by incrementing a count associated with the score, and also incrementing a total count of all such test comparisons for this particular user and biometric device.

At this point, as indicated in block 68, the FRR value for each score/user/biometric device combination may be updated, for optimum performance. Alternatively, this update may be performed periodically. As discussed above, the FRR values are computed from the probabilities associated with the respective scores.

Block 70 indicates what occurs with respect to FRR values when a user logs on to the system when there is no FRR test phase in effect. The user's biometric score or scores are used to access the corresponding FRR values for each particular user, biometric device and score.

It will be appreciated from the foregoing that the present invention represents a significant advance in the use of biometric testing to provide access to various valuable properties. In particular, the invention provides a reliable technique for converting raw biometric scores, measured in various ways, to standardized measures of false acceptance rate and false rejection rate for each combination of user, biometric device and score using that device. It will also be appreciated that, although the invention has been described in detail for purposes of illustration, various changes may be made without departing from the spirit and scope of the invention. Accordingly, the invention should not be limited except as by the appended claims.

What is claimed is:

1. A method for normalizing biometric test scores generated by multiple biometric devices for multiple users, the method comprising the steps of:

for each user enrolled to use each biometric device, maintaining a statistical database containing a standardized measure of accuracy for each possible score of the biometric device for this particular user, wherein the maintaining step includes updating the statistical database each time a user successfully accesses a protected system using at least one of the biometric devices;

obtaining a current score from a biometric device for this particular user; and converting the current score to a standardized measure of accuracy obtained from the statistical database.

2. A method for normalizing biometric test scores generated by multiple biometric devices for multiple users, the method comprising the steps of:

for each user enrolled to use each biometric device, maintaining a statistical database containing a standardized measure of accuracy for each possible score of the biometric device for this particular user;

obtaining a current score from a biometric device for this particular user; and converting the current score to a standardized measure of accuracy obtained from the statistical database;

wherein the step of maintaining a statistical database includes the following steps performed each time a user successfully accesses a protected system using a biometric device:
  obtaining current biometric data from this user;
  comparing the current biometric data of this user with stored biometric templates of other users enrolled to use the same biometric device, wherein the biometric data of this user are compared as "impostor data" with the other user templates, and a comparison score is obtained from the biometric device;
  after each comparing step, updating a count of impostor comparisons performed for each of the other users, and updating a count of the number of times the comparison score is obtained for impostor comparisons relative to each other user;
  updating the probability of occurrence of each comparison score; and
  computing an equivalent false acceptance rate from the probabilities of occurrence of the comparison scores, wherein the false acceptance rate provides an objective measure of security risk for this particular user and biometric device.

3. A method as defined in claim 2, wherein the step of converting the current biometric score to a standardized measure of accuracy includes retrieving from the statistical database a false acceptance rate corresponding to this user, the current biometric device and the current biometric score.

4. A method as defined in claim 1, wherein the step of maintaining a statistical database includes the following steps performed each time a user successfully accesses a protected system during a data gathering phase of operation and provides data to a biometric device:
  obtaining current biometric data from this user;
  comparing the current biometric data of this user with a stored biometric template of this user obtained during enrollment to use the same biometric device, and obtaining a comparison score from the biometric device;
  after each comparing step, updating a count of test comparisons performed for this user, and updating a count of the number of times the comparison score is obtained for this user;
  updating the probability of occurrence of each comparison score; and
  computing an equivalent false rejection rate from the probabilities of occurrence of the comparison scores, wherein the false rejection rate is computed as the sum of the probabilities of obtaining comparison scores lower than the one obtained in the step of obtaining the comparison score under consideration for this user, and provides an objective measure of convenience of use for this particular user and biometric device.

5. A method as defined in claim 4, wherein the step of converting the current biometric score to a standardized measure of accuracy includes retrieving from the statistical database a false rejection rate corresponding to this user, the current biometric device and the current biometric score.

6. A method as defined in claim 2, wherein the step of maintaining a statistical database further includes the following steps performed each time a user successfully accesses a protected system during a data gathering phase of operation and provides data to a biometric device:
  obtaining current biometric data from this user;
  comparing the current biometric data of this user with a stored biometric template of this user obtained during enrollment to use the same biometric device, and obtaining a comparison score from the biometric device;
  after each comparing step, updating a count of test comparisons performed for this user, and updating a count of the number of times the comparison score is obtained for this user;
  updating the probability of occurrence of each comparison score; and
  computing an equivalent false rejection rate from the probabilities of occurrence of the comparison scores, wherein the false rejection rate is computed as the sum of the probabilities of obtaining comparison scores lower than the one obtained in the step of obtaining the comparison score under consideration for this user, and provides an objective measure of convenience of use for this particular user and biometric device.

7. A method as defined in claim 6, wherein the step of converting the current biometric score to a standardized measure of accuracy includes:
  retrieving from the statistical database a false acceptance rate corresponding to this user, the current biometric device and the current biometric score; and
  retrieving from the statistical database a false rejection rate corresponding to this user, the current biometric device and the current biometric score.

8. A biometric score normalizer for use in an authentication system having multiple biometric devices and multiple users, the biometric score normalizer comprising:
  a statistical database containing, for each user enrolled to use each biometric device, at least one standardized measure of accuracy for each possible score of the biometric device;
  means for accumulating data in the statistical database, wherein the at least one standardized measure of accuracy is updated each time a user successfully accesses the authentication system; and
  means for converting a raw biometric device score into at least one standardized measure of accuracy by accessing the statistical database.

9. A biometric score normalizer for use in an authentication system having multiple biometric devices and multiple users, the biometric score normalizer comprising:
  a statistical database containing, for each user enrolled to use each biometric device, at least one standardized measure of accuracy for each possible score of the biometric device;
  means for accumulating data in the statistical database, wherein the at least one standardized measure of accuracy is updated as users attempt access to the authentication system; and
  means for converting a raw biometric device score into at least one standardized measure of accuracy by accessing the statistical database;
  wherein the statistical database contains an equivalent value of false acceptance rate for each combination of user, biometric device and biometric device score, and the means for accumulating data in the statistical database includes:
    means for obtaining current biometric data from this user;
    means for comparing the current biometric data of this user with stored biometric templates of other users enrolled to use the same biometric device, wherein the biometric data of this user is compared as "impostor data" with the other user templates, and a comparison score Is obtained from the biometric device;

means operative after the means for comparing, for updating a count of impostor comparisons performed for each of the other users, and updating a count of the number of times the comparison score is obtained for impostor comparisons relative to each other user;

means for updating the probability of occurrence of each comparison score; and means for computing an equivalent false acceptance rate from the probabilities of occurrence of the comparison scores, wherein the false acceptance rate provides an objective measure of security risk for this particular user and biometric device.

10. A biometric score normalizer as defined in claim 8, wherein the statistical database contains an equivalent value of false rejection rate for each combination of user, biometric device and biometric devices score, and the means for accumulating data in the statistical database includes:

means for obtaining current biometric data from a user during a test phase of operation;

means for comparing the current biometric data of this user with a stored biometric template of this user obtained during enrollment to use the same biometric device, and obtaining a comparison score from the biometric device;

means for updating a count of test comparisons performed for this user, and updating a count of the number of times the comparison score is obtained for this user;

means for updating the probability of occurrence of each comparison score; and means for computing an equivalent false rejection rate from the probabilities of occurrence of the comparison scores, wherein the false rejection rate is the sum of the probabilities of obtaining comparison scores lower than the one obtained by the means for obtaining the current biometric data of this user, and wherein the false rejection rate provides an objective measure of convenience of use for this particular user and biometric device.

* * * * *